United States Patent
Cronin et al.

(10) Patent No.: US 6,268,059 B1
(45) Date of Patent: *Jul. 31, 2001

(54) REDUCTION OF HAZE IN TIN OXIDE TRANSPARENT CONDUCTIVE COATINGS ON GLASS

(75) Inventors: John P. Cronin; Michael Trosky; Anoop Agrawal, all of Tucson, AZ (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/304,187

(22) Filed: May 3, 1999

Related U.S. Application Data

(60) Division of application No. 07/914,852, filed on Jul. 15, 1992, now Pat. No. 5,900,275, which is a continuation-in-part of application No. 07/886,505, filed on May 20, 1992.

(51) Int. Cl.$^7$ ................. B32B 17/06; B05D 5/06

(52) U.S. Cl. ............ 428/432; 428/469; 428/702; 427/108; 427/110; 427/126.2; 427/126.3; 427/168; 427/169; 427/226; 427/419.3

(58) Field of Search ............. 427/126.2, 126.3, 427/108, 226, 419.3, 240, 421, 430.1, 165, 168, 169, 102, 110

(56) References Cited

U.S. PATENT DOCUMENTS

| | | |
|---|---|---|
| 3,806,229 | 4/1974 | Schoot et al. . |
| 4,252,841 | 2/1981 | Kinugawa et al. ............. 427/108 |
| 4,490,227 | 12/1984 | Bitter . |
| 4,568,578 | 2/1986 | Arfsten et al. . |
| 4,712,879 | 12/1987 | Lynam et al. . |
| 4,776,870 | 10/1988 | Meyer et al. . |
| 4,788,079 | 11/1988 | Lindner . |
| 4,855,161 | 8/1989 | Moser et al. . |
| 4,959,247 | 9/1990 | Moser et al. . |
| 4,996,083 | 2/1991 | Moser et al. ............. 427/108 |
| 5,009,928 | 4/1991 | Hayashi et al. . |
| 5,252,354 | * 10/1993 | Cronin et al. ............. 427/58 |
| 5,277,986 | * 1/1994 | Cronin et al. ............. 428/432 |
| 6,048,621 | * 4/2000 | Gallego et al. ............. 428/432 |
| 6,124,026 | * 9/2000 | McCurdy et al. ............. 428/216 |

OTHER PUBLICATIONS

Chopra, K.L.; Major, S. and Pandya, D K., "Transparent Conductors—A Status Review," *Thin Solid Films*, 102 (1983) 1. (no month).

Vossen, J. L., "Transparent Conducting Films," *Physics of Thin Films*, 9 (1977) 1. (no month).

Haacke, G., "Transparent Conducting Films," *Ann. Rev. Mater. Sci.*, 7 (1977) 73. (no month).

Jarzebski, Z. M. and Marton, J. P., "Physical Properties of $SnO_2$ Materials," *J. Electrochem. Soc.*, 123 (1976) 199C. (no month).

Blandenet, G.; Court M. and Largarde, Y., "Thin Layers Deposited by the Pyrosol Process," *Thin Solid Films*, 77 (1981) 81. (no month).

Upadhyay, J. P.; Vishwakarma, S. R. and and Prasad, H. C., "Studies of Electrical and Optical Properties of $SnO_2$:P Films," *Thin Solid Films*, 169 (1989) 195. (no month).

(List continued on next page.)

*Primary Examiner*—Shrive Beck
*Assistant Examiner*—Kirsten A. Crockford
(74) *Attorney, Agent, or Firm*—Van Dyke, Gardner, Linn & Burkhart, LLP

(57) ABSTRACT

The haze in a conductive tin oxide coating deposited on a substrate, particularly glass, can be reduced by applying, to a desired thickness, a solid-state coating, where the solid-state layer is applied as a precursor liquid to the tin oxide layer, is then dried and/or converted to a solid-state film overlying the conductive tin oxide film on the substrate.

31 Claims, 3 Drawing Sheets

OTHER PUBLICATIONS

Suzuki, K. and Mizuhashi, M., "Structural, Electrical and Optical Properties of R.F.–Magnetron–Sputtered $SnO_2$:Sb Film," *Thin Solid Films*, 97 (1982) 119. (no month).

De Waal, H. and Simonis, F., "Tin Oxide Coatings: Physical Properties and Applications," *Thin Solid Films*, 77 (1981) 253. (no month).

Afify, H. H.; Momtaz, R. S.; Badawy, W. A. and Nasser, S. A., "Some Physical Properties of Fluorine–Doped $SnO_2$ Films Prepared by Spray Pyrolysis," J. Mat. Sci.: *Materials in Electronics*, 2 (1991) 40. (no month).

Glaser, P. M. and Pantano, C. G., "Effect of the $H_2O$/TEOS Ratio Upon the Preparation and Nitridation of Silica Sol/Gel Films," *J. Non–Crystalline Solids*, 63 (1984) 209. (no month).

Shane, M. and Mecartney, M. L., "Sol–Gel Synthesis of Zirconia Barrier Coatings," *J. Mat. Sci.*, 25 (1990) 1537. (no month).

Debsikdar, J. C., "Transparent Zirconia Gel–Monolith From Zirconium Alkoxide," *J. Non–Crystalline Solids*, 86 (1986) 231. (no month).

Lynam, N. R., "Transparent Electronic Conductors," published in Carpenter, M. K. and Corrigan, D. A., "Proceedings of the Symposium on Electrochromic Materials," Physical Electrochemistry Division, The Electrochemical Society, Inc., Proceedings vol. 90–2 (1990), pp. 201–231. (no month).

* cited by examiner $10\Omega/\square$ $SnO_2$ $10\Omega/\square$ $SnO_2$ with $WO_3$ overcoat

REDUCTION OF HAZE IN TIN OXIDE TRANSPARENT CONDUCTIVE COATINGS ON GLASS

CROSS REFERENCE TO RELATED APPLICATION

This is a division of Ser. No. 07/914,852, filed Jul. 15, 1992, now U.S. Pat. No. 5,900,275 by John P. Cronin, Anoop Agrawal and Michael Trosky, entitled REDUCTION OF HAZE IN TIN OXIDE TRANSPARENT CONDUCTIVE COATINGS ON GLASS, and is a continuation-in-part of Ser. No. 07/886,505, filed May 20, 1992, by John P. Cronin, Daniel J. Tarico, Anoop Agrawal, and Raymond L. Zhang, entitled METHOD FOR DEPOSITING ELECTROCCHROMIC LAYERS, the disclosures of which are hereby incorporated by reference herein.

BACKGROUND OF THE INVENTION

This invention relates to decreasing surface roughness of coatings deposited on glass or equivalent substrates with consequent improvement in optical quality by a reduction in haze. Specifically, the invention reduces the haze typically seen in commercially available doped tin oxide coatings on glass, and particularly those coated in deposition processes requiring high substrate temperatures.

Transparent conductive coatings on glass have a wide range of applications in the electronics and optics industry. Thin films of such coatings are highly transparent in the visible region of the spectrum, have high electronic conductivities and are used extensively in information displays. The most widely used transparent conductors are indium oxide doped with tin (ITO) and doped tin oxide coatings, with doped tin oxide being widely used in displays and as solar coatings. Tin oxide coatings are also widely used in electrochromic devices.

Doped tin oxide is a highly durable oxide coating and is a useful transparent conductor where chemical stability and hardness are required. It can be deposited onto glass using many different techniques, for example, ultrasonically assisted spray, chemical vapor deposition, RF sputtering, and spray coating. Depending on the deposition technique and doping level, specific resistivities in the range of $4 \times 10^{-4}$ ohms cm to $1 \times 10^{-3}$ ohms cm can be obtained. For vacuum-deposited tin oxide, the dopant is usually antimony with dopant levels being less than five mole percent. However, $SnO_2$ doped with fluorine is more conductive than the antimony-doped material and is usually deposited by spray deposition. Resistivity as low as $5 \times 10^{-4}$ ohms cm and high visible transparency are not unusual for spray deposited fluorine-doped tin oxide.

Tin oxide is available commercially by a spray pyrolysis deposition method, where the deposition is done on the float line as the glass is produced. This is relatively cheap compared to evaporation or sputtering techniques, which makes float line-deposited tin oxide very attractive as a transparent conductor in commercial devices.

A problem with this glass for the applications described above, and many others, however, is their high haze and/or high surface roughness. This haze increases and is particularly noticeable in thick coatings which have been deposited at high temperature onto soda lime glass (or onto $SiO_2$ barrier-coated glass, or equivalent barrier-coated glass where the barrier coating is insufficiently effective).

For most tin oxides and particularly tin oxides deposited by high-temperature means such as spray pyrolysis, CVD or the like, when the coating material contacts a heated substrate, typically greater than 400° C. or thereabouts and often as high as 500–700° C., and most particularly where the substrate has an exchangeable ion such as sodium which can react with a component of the coating precursor (i.e., the chloride in tin tetrachloride), a haze results. This is disadvantageous in windows but is most undesirable in specular mirrors such as rearview mirrors end the like, which can appear cloudy in reflection when tin oxide-coated glass is used as a substrate in a second surface design. Surface roughness contributes significantly to this haze. Although not being bound by theory, we speculate that a lack of intimate contact and/or refractive index mismatch between the rough tin oxide surface and the medium it contacts contributes significantly to the haze appearance. Further, surface roughness increases the difficulty of cleaning the coating surface. Although surface polishing, such as with a cerium oxide slurry or the like, is commonly recommended to reduce the haze seen in tin oxide coatings, and render such coatings more readily cleanable, such polishing is economically disadvantageous and is not entirely effective.

Transparent conductors play an important role in electrochromic devices. Indeed, tin oxide is one of the most widely used transparent conductors in electrochromic devices. For example, U.S. Pat. No. 3,806,229 to Schoot et al. describes single-compartment, self-erasing, solution-phase electrochemichromic (ECC) devices that utilize two glass plates, coated on their inwardly facing surfaces with a conductive layer of tin oxide, that sandwich a solution of an organic solvent such as acetonitrile containing electrochromically-active organic species dissolved therein. Such organic solutions, which typically have a refractive index between 1.3 to 1.6, inherently render usable ECC devices that utilize commercially available tin oxide-coated glass. Mirror and window devices utilizing such construction and solutions inherently have low to negligible haze and are of acceptable optical quality.

However, there are important advantages to using a solid-state, thin-film electrochromic device, instead of a solution phase electrochromic device. For example, the solid-state, thin-film electrochromic construction 1, shown schematically in FIG. 1, as typically applied fails to overcome the optical haze present in most commercially available tin oxide transparent electron conductors. The device shown in FIG. 1 typically consists of an electrochromic working electrode 10 and a counter electrode 20 which can function as either a sink or source of ions for use in coloring the electrochromic working electrode. Both the working and counter electrode are separated by an electrolyte 30 that is ion-conducting but electron-insulating. The two electrodes 10/20 and the electrolyte 30 are sandwiched between two electron conductor layers 40 deposited on substrates 50, which are glass. Layers 40 are connected to a power source 45. For economic reasons, it would be desirable to use high temperature deposited doped tin oxide coatings as conductive layers 40. However, in the case of a transmissive device, both of these conductors 40 must be highly transparent, and in the case of a mirror device one can be reflective. The various electrochromic films 10, 20 and 30 have typically been applied either by sputtering or by vapor deposition. While such films have also been applied by wet chemical deposition techniques, such applications have apparently only been made to tin-doped indium oxide coatings, which have an inherent clarity and lack of haze. The haze associated with tin oxide layers has discouraged their use in electrochromic devices which must be of good optical quality.

SUMMARY OF THE INVENTION

In the present invention, it has been found that the haze and/or surface roughness in a conductive tin oxide coating deposited on a substrate, particularly glass, can be reduced by applying to the tin oxide coating another solid-state coating in a particular way. Specifically, this invention relates to haze reduction in tin oxide films by coating by a wet chemical coating means and then converting the coating to a solid-state layer. These solid-state, haze-reducing coatings can be conducting semiconducting or insulating to suit any desired application. We further find that these benefits are not derived when the same coating material of the same thickness is deposited by vacuum deposition (evaporation, sputtering or equivalent) rather than by the wet chemical method of this invention.

DESCRIPTION OF THE PREFERRED EMBODIMENT

Figure 1:
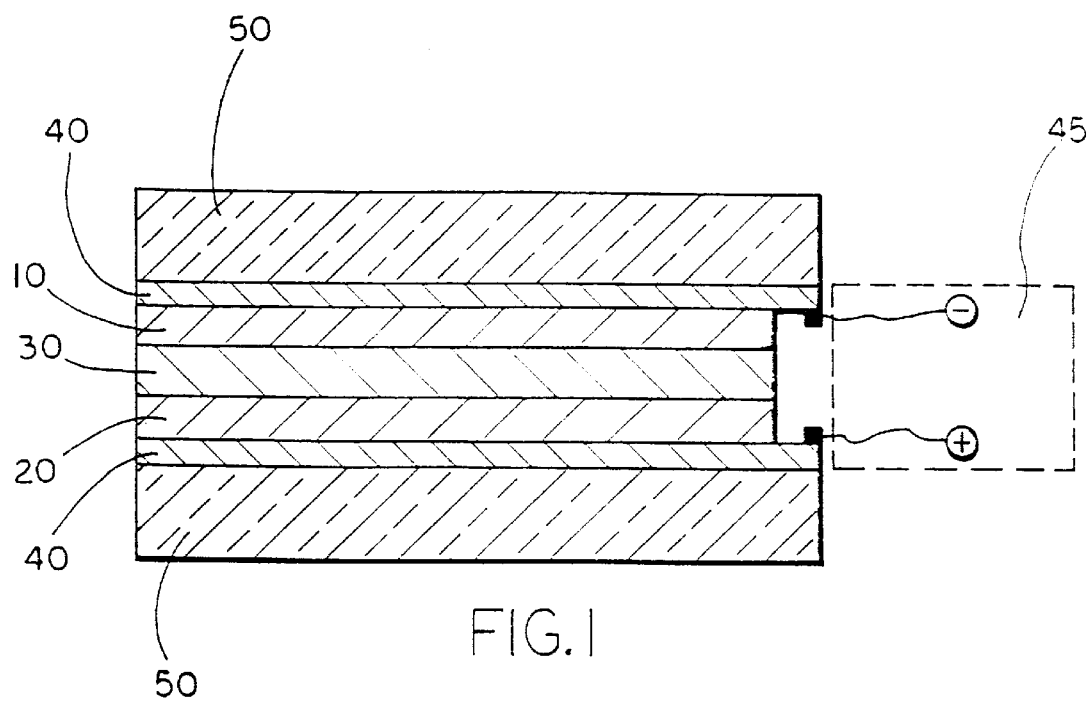
FIG. 1 illustrates a cross section of a thin-film electrochromic device.

This invention relates to improving the optical quality of hazy coated substrates, such as highly conductive tin oxide coatings. This is achieved by:

1. overlaying the tin oxide layer with a coating by a wet chemical means (dip coating, spin coating, spray deposition or casting) such that it wets the surface well, and
2. Converting the overlaying coating to a solid-state film. The coating can be conducting, semiconducting, dielectric or insulating, depending on the application.

The coating may consist of inorganic materials or organic materials, e.g., polymers. The solid-state layer can be an active layer which uses the conductive layer to function as well as improving its optical quality. Examples of such layers are electrochromic, electroluminescent, solar reflecting, dielectric, ferroelectric, conducting or absorbing, or have non-linear optical properties.

The tin oxide haze problem is most predominant in high conductivity tin oxide coatings. These are thicker coatings typically deposited at high temperature. Such conductive tin oxide coatings have a sheet resistance of less than about 100 ohms per square, preferably less than or equal to about 20 ohms per square, more preferably the tin oxide coating has a sheet resistance of less than or equal to about 10 ohms per square. In glass applications where one should be able to see through the glass and the conductive coating, it is important that the conductive coating be very thin so that light transmission is not excessively inhibited. In order to achieve a sheet resistance of less than about 10 ohms per square and still have a coated piece of glass with a light transmission of 70% or greater, the tin oxide conductive coating should have a specific resistivity of less than about $8 \times 10^{-4}$ ohms cm, and most preferably less than about $5 \times 10^{-4}$ ohms cm.

The amount of haze present in a tin oxide coating on a glass substrate can be measured by a device known as the XL-211 HAZEGARD haze meter available from BYK Gardner, Co Inc., Gardner Laboratories, Silver Springs, Md. The amount of surface roughness associated with a tin oxide coating can be measured by using a Tencor Instruments' ALPHA-STEP 200 surface profilometer with a 1.5–2.5 micron radius stylus. The haze meter determines the level of haze present in the coating. The surface profilometer determines the surface roughness of a coating by obtaining a surface profile of the coating and then calculating the arithmetic average surface roughness of the coating.

As measured by the XL-211 HAZECARD haze meter and the surface profilometer, uncoated transparent glass has a haze level of 0% and an average roughness factor of about 15 angstroms. Generally, the level at which haze can be detected by the human eye is about 2%. When the haze level approaches 30%, the substrate or coating becomes opaque and objects on the other side of the glass cannot be seen through the glass, similar to frosted glass.

As described in the present disclosure, however, it has been surprisingly found that application of a second solid-state, thin-film coating by a wet chemical coating means in accordance with this invention to the coated substrate reduces haze present in tin oxide surfaces.

FIRST EMBODIMENT

In a first preferred embodiment, a metallic oxide precursor is dissolved in a suitable carrier solvent to form the precursor solution. The solution is then applied by a wet chemical means to a substrate with a conductive tin oxide coating to give a coating over the conductive surface. Among the preferred wet chemical coating means are dip coating, spray coating, spin coating or casting. The coating is dried and fired in an oven to complete the condensation and hydrolysis to yield a conductive tin oxide-coated substrate to which a second oxide coating has been applied so that said second coating overlayers said tin oxide coating. The overlaying, solid-state oxide coating surprisingly improves the optical quality of the conductive tin oxide coating on the substrate by reducing the haze present in the tin oxide coating.

In addition to improving the optical quality of the conductive tin oxide coating on the substrate, the overlayer can also have other functionalities. For example, the overlayer can be electrochromic, electroluminescent, solar reflecting, dielectric, ferroelectric, conducting, semiconducting, insulating, or absorbing. Typical metals which can be used as starting materials include those of tungsten, molybdenum, manganese, chromium, rhenium, iridium, zinc, nickel, indium, and others, as well as mixtures of the foregoing, such as indium/tin to form indium tin oxide. Silicon is also considered a metal for purposes of this invention. The derivatives of these transition metals can be used separately or mixtures of them can be used to form coatings.

The preferred metallic oxide precursor solution can be prepared by reacting a metal with a mixture of hydrogen peroxide and an organic acid such as acetic acid. The resulting metal-peroxy acid product, the metal oxide precursor, is then esterified by reacting with lower carbon solvents to form a metal-peroxyester derivative solution. In an especially preferred embodiment of the present invention, the solid-state coating applied over the hazy tin oxide coating is an electrochromically-active transition metallic oxide coating. Accordingly, the method for forming the preferred metallic oxide precursor solution will be described in greater detail with reference to the use of transition metals.

The precursor solution can be formed by reacting the transition metal with a solution of a mixture of hydrogen peroxide and an organic acid, or sequentially reacting the hydrogen peroxide with the transition metal. The reaction product is filtered and the filtrate preferably is evaporated to dryness under reduced pressure. The resulting transition metal-peroxy acid product (liquid or powder) is then reacted at room temperature by mixing with a lower carbon alcohol to form a transition metal-peroxyester derivative. This solution can be used for dipping, but preferably the transition metal-peroxyester derivative is isolated by removing excess alcohol under vacuum. This peroxyester-transition metal derivative, when dissolved in a suitable carrier solvent, constitutes the preferred dipping solution.

The reaction between the transition metal, hydrogen peroxide and organic acid is conducted at a temperature controlled at about −10° C. to about 12° C. The ingredients are then allowed to react at that temperature from about 16 to about 26 hours. After the reaction, the reaction product is filtered to remove the solids from the filtrate. The filtrate is then refluxed for about 10 to about 18 hours at from about 45° C. to about 60° C. and then refiltered. This second filtrate is usually dried to recover the transition metal-peroxy acid product as a power. The transition metal-peroxy acid product (liquid or powder) is then reacted at room temperature with an alcohol in a flask loaded with a stir bar. The reaction temperature can vary from around 22° C. to around 55° C., and the reaction time can vary from about 30 hours to about one-half hour, depending on temperature. The resultant solution containing this derivative can then be used to coat the conductive tin oxide surface of a substrate or the alcohol can be removed and then the product mixed with a carrier solvent prior to coating the substrate. Preferably, the peroxyester-transition metal derivative is stored long-term at below 10° C.

For electrochromic coatings, the transition metal oxide ultimately formed must be electrochiomically-active. Typical transition metals which can be used as starting materials include those of tungsten, molybdenum, manganese, chromium, rhenium, iridium, nickel and others. The peroxyester derivatives of these transition metals can be used separately or mixtures of them can be used to form electrochromic coatings.

In addition, the peroxyester derivatives of these transition metals can be mixed with peroxyester derivatives or peroxy acid products, other transition metals or non-transition metal oxides, such as silica and titanium dioxide, to form electrochromic coatings. Mixtures of transition metal peroxyester derivatives form electrochromic coatings having enhanced color efficiency. Mixtures of a transition metal-peroxyester derivative and a non-transition metal-peroxy acid product or a non-transition metal-peroxyester derivative form electrochromic coatings having enhanced durability.

The electrochromic precursors can be prepared in several different ways to yield mixed electrochromically-active metallic oxide coatings. A second metal can be reacted with hydrogen peroxide and an organic acid to form a second transition metal-peroxy acid product, which can then be mixed with a peroxyester-transition metal derivative to form a peroxyester-transition metal/second metal-peroxy acid mixture.

The peroxide used for forming that peroxy acid product is typically hydrogen peroxide. It is contemplated, however, that other peroxides can be utilized such as peroxyacetic acid and 3-chloroperoxybenzoiz acid.

Organic acids are used for forming the peroxy acid product. While a variety of organic acids are operable, the most preferred organic acids are acetic acid and propionic acid.

The preferred carrier solvents added to the transition metal-peroxy acid product are methanol, ethanol, propanol, isopropanol, and mixtures thereof, although butyl and pentyl alcohols are broadly operable. Other carrier solvents include tetrahydrofuran, diethyl ether and other equivalents thereto.

The precursor is dissolved in the carrier solvent in a concentration of. from about 5% to about 60% by weight. Typical solutions will comprise from about 3 to about 10 weight/volume (grams/milliliter) percent electrochromic precursor to carrier solvent.

Upon formation of the precursor solution, the solution is deposited on the conductive tin oxide-coated substrate by spin, dip, spray, casting or equivalent wet chemical means. In the case of dipping, the substrate is dipped into the solution and slowly withdrawn. The thickness of the coating is a function of the withdrawal rate and the viscosity of the dipping solution as shown in Equation 1.

$$t = \left(\frac{2v_s n}{dg}\right)^{1/2}$$

Where: t=coating thickness
  $V_s$=withdrawal rate
  n=viscosity
  d=coating density
  g=gravitational constant The coating thickness can be varied over a wide range merely by regulating the withdrawal rate, dipping solution concentration and the viscosity of the dipping solution. Removal rates of between about 8 to 50 centimeters per minute and solution concentrations between about 10 and 15 weight percent yield coatings of from 200 to 10,000 angstroms.

The as-deposited coating is converted to a metal oxide coating by removal of the carrier solvent and by hydrolysis, condensation and similar reactions, preferably by firing at temperatures of about 150° C. to about 400° C., more typically about 250° C. to about 400° C. The coated substrate is gradually heated from room temperature to the conversion temperature (about 250° C. if an amorphous end product is desired, above about 350° C. if a crystallized end product is desired) at a rate of 10° C. per minute or lower, preferably 5° C. per minute. Firing is preferably allowed to proceed for about 15 to about 120 minutes. Different metallic oxide coatings will require differing firing conditions as will be appreciated by reference to the examples herein. The as-deposited coating can be placed in a vacuum, or exposed to a flow of inert gas such as nitrogen or argon or the like, to remove the carrier solvent, followed by heat treatment at elevated temperatures to ultimately form the desired oxide structure.

SECOND EMBODIMENT

In another embodiment, a liquid or dissolved carbon polymer precursor serves as the precursor solution. The solution is applied by wet chemical means to a substrate with a conductive tin oxide coating to give a coating over the conductive surface. The polymer is then cooled/dried and cured to solid-state so that the solid polymer coating overlayers the tin oxide coating. The overlayering polymer coating improves the optical quality of the conductive tin oxide coating on the substrate by producing the haze present in the tin oxide coating. The preferred carbon polymer is an acrylate epoxy urethane polymer.

EXAMPLES

The following Examples illustrate the preparation of preferred coating solutions:

Example 1

A 10 ohms/square tin oxide-coated glass from Libby Owens Ford, Toledo, Ohio, supplied under the trade name TEC 10, with a haze factor of 5.0% was coated with an electrochromic coating of tungsten oxide as follows. Forty (40) milliliters of deionized water was placed in a one liter pear-shaped flask loaded with a stir bar. The flask was placed in an ice bath with 800 milliliters of a 1:1 solution of hydrogen peroxide (31 volume percent) and glacial acetic acid. When the mixture equilibrated to the bath temperature, 65 grams of tungsten metal was added to the mixture and the mixture was allowed to react for 24 hours and the remaining solids removed by filtering. This liquid was refluxed for 18 hours at 55° C. The solution was dried in a vacuum to recover powdered tungsten peroxy acid product. Fifty (50) grams of this powder was reacted with 250 milliliters of dry ethanol. The solution was filtered and the solvents removed under reduced pressure to isolate the resulting tungsten peroxyester derivative. Eight (8) grams of tungsten peroxyester derivative was dissolved in 60 milliliters of ethanol to form the dipping solution. The TEC 10 glass was dipped into the solution and withdrawn at a rate of 27 centimeters per minute. The coating was heated to 250° C. for one hour and its thickness was 600 angstroms. The coating reduced the haze from 5.0 to 2.9%. The coating was placed in a 0.01N $H_2SO_4$ cell with an Ag/AgCl reference electrode and a platinum counter electrode. When −0.4 volts was applied to color, its luminous transmission was 15% and in the bleached state was 85%.

Example 2

Figure 2A:
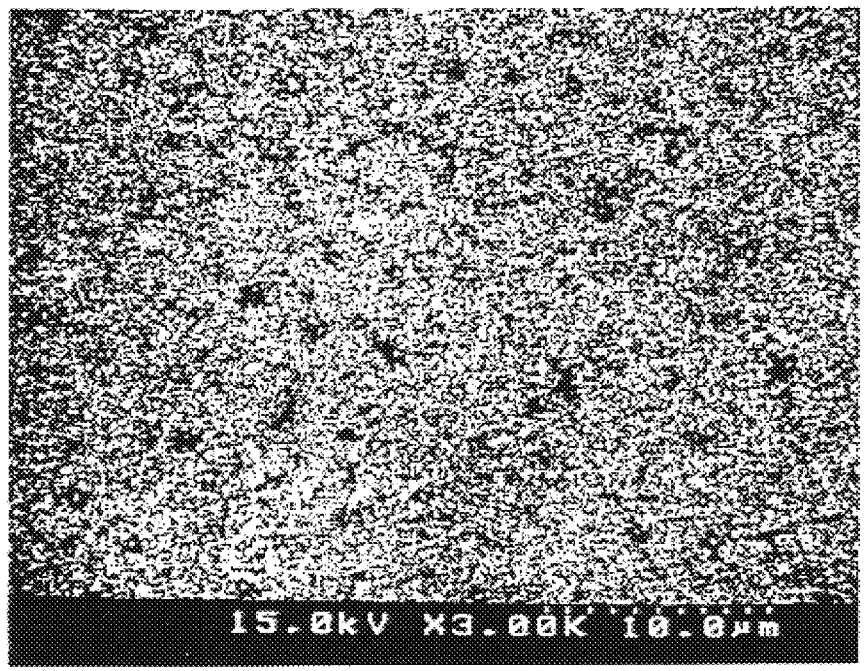
FIG. 2A illustrates a scanning electron microscope photo of 10 ohm/square $SnO_2$-coated glass before and coating with $WO_3$.
Figure 2B:
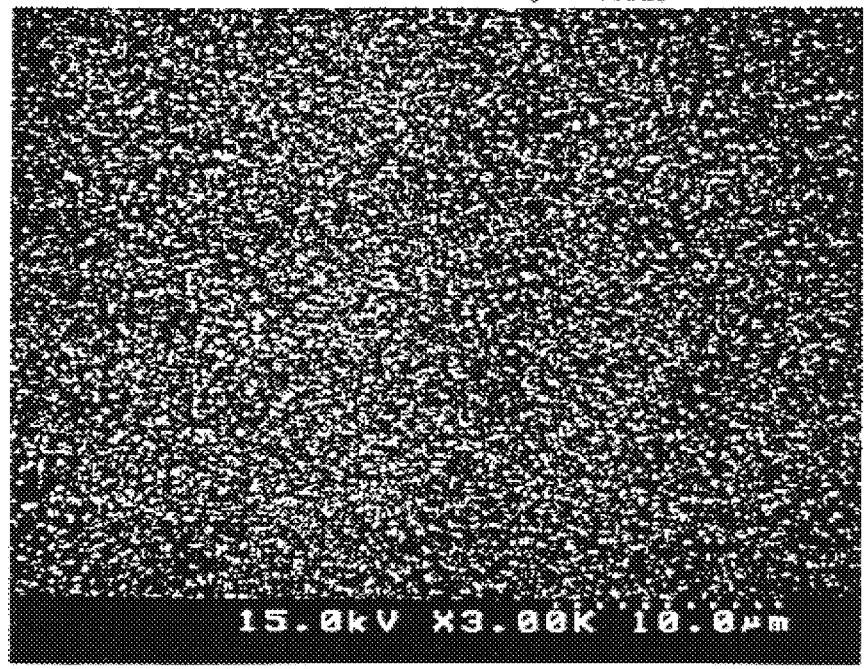
FIG. 2B illustrates a scanning electronic microscope photo of 10 ohm/square $SnO_2$-coated glass after coating with $WO_3$.
Figure 3:
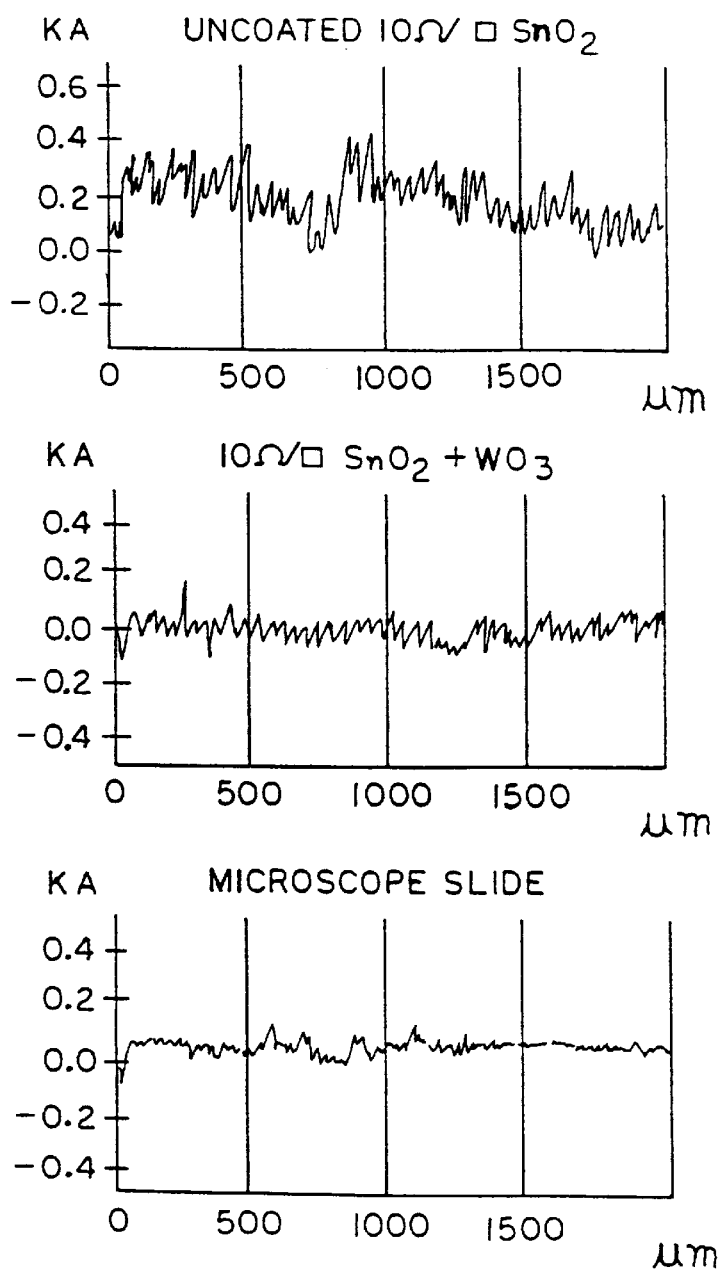
FIG. 3 illustrates surface profilometry scans of 10 ohm/square $SnO_2$ and $WO_3$ coated 10 ohm/square $SnO_2$ and the roughness factors determined from those scans.

A TEC 10 conductive $SnO_2$ glass was coated with an overlayer of $WO_3$ as described in Example 1, except that the withdrawal rate was adjusted to give a coating 1,200 angstroms thick. The $WO_3$ overlayer improved the surface roughness of the TEC 10 substrate as examined using a Tencor Instruments ALPHA-STEP 200 surface profilometer with a 1.5–2.5 micron radius stylus. The arithmetic average surface roughness (RA) and a surface profile were obtained from the analysis and are shown in FIG. 3. Also shown in the figure is the RA factor and surface profile for a smooth microscope slide glass surface. The overlayer of $WO_3$ reduced the RA factor from 70 angstroms to 25 angstroms, which is approaching the value of the smoother microscope slide of 15 angstroms. FIG. 2 shows scanning electron microscope (SEM) photos of the TEC 10 glass before and after overcoating with $WO_3$.

Example 3

A 20 ohms/square (TEC 20) $SnO_2$-coated glass from Libby Owens Ford, Toledo, Ohio, was coated with a $WO_3$ overlayer using the solution described in Example 1. The solution concentration was adjusted such that at a spin rate of 1,600 rpm, it could be spin-coated onto $SnO_2$ to give a film thickness of 3,300 angstroms when heated to 250° C. The overlayer coating reduced the haze of the $SnO_2$ layer and improved its roughness factor (RA) from 55 angstroms to 25 angstroms.

Example 4

The haze in TEC 10 glass was reduced by coating with an overlayer of sol-gel $SiO_2$ as follows. To 226 milliliters of a 50:50 mixture of ethanol and deionized water was added 113 milliliters of tetraethyl orthosilicate. To the turbid mixture was added one milliliter of 1.0M HCl to give a clear solution. The mixture was left standing for 12 hours. One part of this mixture was diluted with two parts of ethanol and heated to 60° C. for one hour. It was then cooled to room temperature to form the dipping solution. The solution was dip-coated onto 10 ohms/square TEC 10 glass using a withdrawal rate of 800 rpm. The coating was heated to 350° C., and the coating thickness was 350° angstroms. The surface roughness improved from an RA factor of 70 angstroms to 40 angstroms on overcoating with $SiO_2$, and its luminous transmission changed from 77.8% uncoated to 82.0% coated. This coating was compared to a RF-sputtered coating of $SiO_2$ onto TEC 10 glass. It was found that the sputtered $SiO_2$ retained the surface roughness and profile of the $SnO_2$ coating and did not reduce the haze. However, the sol-gel $SiO_2$ applied and converted coating reduced the haze from 5.0 to 3.4%.

Example 5

A 10 ohms/square (TEC 10) tin oxide-coated glass was coated with a conductive layer of antimony doped tin oxide as follows. Ten grams of tin (II) chloride were reacted with a 200 milliliter solution of a 50:50 mixture of hydrogen peroxide (30 volume percent) and acetic acid at 0° C. The mixture was allowed to react for 30 minutes until a clear solution formed. To this mixture at 0° C. was added antimony pentachloride to give an atomic ratio of Sn/Sb=0.05. The mixture was allowed to react for a further 30 minutes and to equilibrate to room temperature. The solution was heated to 55° C. for 24 hours, and the product isolated by removing excess solvent under reduced pressure at 55° C. The resulting tin antimony complex, a clear, viscous paste, was dissolved in 100 milliliters of ethanol to form the spin coating solution. The solution was spin-coated onto borosilicate glass and 10 ohms/square tin oxide-coated glass at 2,000 rpm and heated to 450° C. in air. The resistivity of the coating was measured using the conventional four-point probe technique. On the borosilicate glass the coating had a specific resistivity of $1.6 \times 10^{-2}$ ohms cm. The coating on the 10 ohms/square tin oxide-coated glass was 400 angstroms thick, and had no measurable effect on the conductivity, which remained at 10 ohms/square. On coating the $SnO_2$, its luminous transmission changed from 77.8% to 79.8% and its surface roughness changed from an RA factor of 75 to 15 angstroms. Note, other transparent conductive oxides can be similarly deposited onto TEC 10 glass using sol-gel techniques. For example, indium tin oxide can be deposited using the method described in U.S. Pat. No. 4,568,578 to Arfsten et al. Also, we find that use of the sol-gel applied metal oxide coatings can even further reduce any residual haze present in electrochromic devices utilizing doped tin oxide transparent substrates as are described in U.S. Pat. No. 3,806,229 to Schoot et al.

Example 6

A 10 ohms/square (TEC 10) tin oxide-coated glass was coated with a conductive layer of fluorine-doped tin oxide as follows. Eight (8) grams of tin (II) chloride was reacted with a 200 milliliter solution of a 50:50 mixture of hydrogen peroxide (30 volume percent) and acetic acid at 0° C. The mixture was reacted for 30 minutes and warmed to room temperature. It was heated to 55° C. for 24 hours and the product isolated by removing excess solvent under reduced pressure at 55° C. The resulting peroxotin complex was a clear, viscous paste which was dissolved in 100 milliliters of ethanol. To this solution was added three mole percent ammonium fluoride to form the spin coating solution. The solution was spin-coated onto TEC 10 glass and borosilicate glass at a spin rate of 3,000 rpm and heated to 450° C. for 30 minutes. The thickness of the coating was 1,200 angstroms and its specific resistivity was $4.36 \times 10^{-2}$ ohms cm. The reduction of the haze in the coating could be easily seen by placing the TEC 10 glass with the overlayer of fluorine-doped tin oxide in front of a mirror and comparing it to an uncoated TEC 10 glass. The TEC 10 glass with the overlayer gives a sharp, clear reflected image, whereas the uncoated glass results in a hazy, grey reflected image. As an alternative, these benefits can be achieved by overcoating the tin oxide with indium oxide or indium/tin oxide, aluminum-doped zinc oxide or equivalent conducting thin-films, deposited in accordance with this invention.

Example 7

A sol-gel coating of $ZrO_2$ was used to enhance the optical quality of TEC 10 glass. The dipping solution was prepared as follows. To 100 milliliters of isopropyl alcohol was added 1.3 milliliters of 2,4-pentanedione and nine milliliters of a 70% solution of zirconium (IV) isopropoxide in isopropyl alcohol. The solution was left stirring for several hours, and then 0.5 milliliters of 38% HCl solution was added. This mixture, after standing overnight, constituted the dipping solution. The TEC 10 glass was dipped into the solution and withdrawn at a rate of 800 rpm and heated to 350° C. to give a coating 50 angstroms thick. It improved the surface roughness of the transparent conductor from an RA factor of 75 angstroms to 25 angstroms.

Example 8

A sol-gel coating of $V_2O_5$ was used to overlayer TEC 10 glass. The sol-gel coating was prepared by adding 25.4 grams of vanadium triisopropoxide-oxide to 71.5 milliliters of isopropanol. The solution was left standing overnight and dip-coated onto TEC 10 glass at a withdrawal rate of 27 centimeters per minute. The coating was heated to 350° C. and was 1,450 angstroms thick. It reduced the haze in the TEC 10 glass from 5.0 to 3.2%, end reduced the surface roughness from an RA factor of 75 to 30 angstroms.

Example 9

A coating solution was provided consisting of an acrylated epoxy urethane polymer precursor (B566 DuPont Quick Cure UV curable product) available from E.I. DuPont de Nemours U.S.A., Wilmington, Del. This wet chemical was spin-coated at 4,500 rpm onto TEC 10 glass. The coating so formed was cured under nitrogen in a UV chamber for five minutes. The resulting polymeric coating reduced the haze in the TEC 10 glass from 5.0 to 1.1% and decreased its surface roughness from an RA factor of 75 to 10 angstroms. Similar beneficial results can be achieved by wet chemical deposition of polymers such as polyanaline, Prussian blue, and the like.

Example 10

Figure 4:
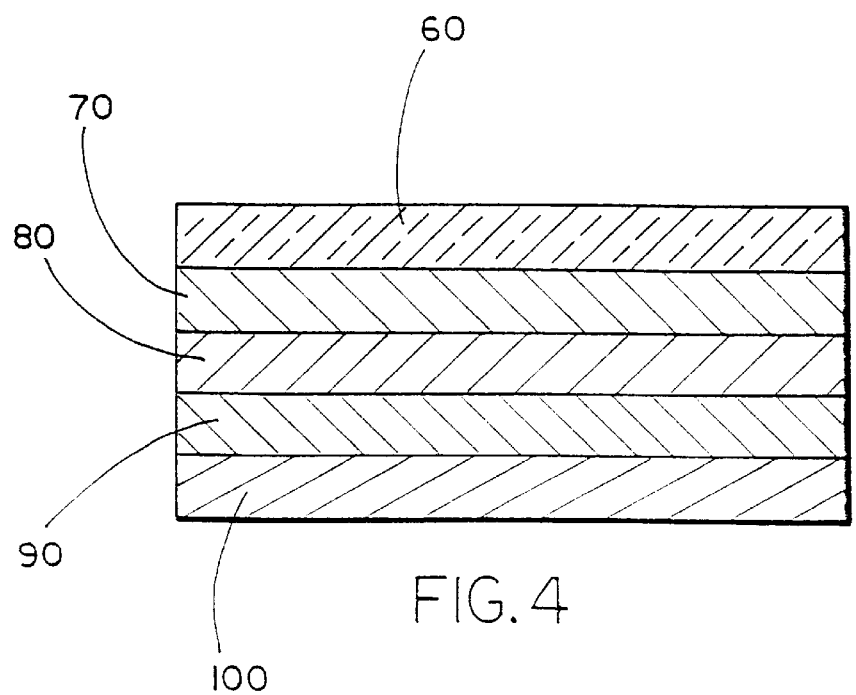
FIG. 4 illustrates a cross section of a solid-state electrochromic mirror.

An all solid-state mirror can be constructed according to the teaching of U.S. Pat. No. 4,712,879 (1987) by Lynam et al., whereby the stack design is as shown in FIG. 4. TEC 10 glass 60 provides the conductive tin oxide layer. A nickel oxide layer 70 is deposited by wet chemical means, and dried and converted in the manner disclosed herein. A tantalum pentoxide electrolyte layer 80, tungsten oxide counter electrode layer 90 and reflective aluminum layer 100 can be vacuum-deposited or deposited by wet chemical means, and dried and converted in the same manner as layer 70. Such a process can yield a high quality specular reflection when compared to the situation when the nickel oxide is deposited by non-wet chemical means such as vacuum deposition, etc. When the nickel oxide layer 70 contacting the TEC 10 is vacuum deposited onto the TEC 10, the mirror has poor optical quality and appears cloudy.

Of course, it is understood that the above is merely a preferred embodiment of the invention and that various changes and alterations can be made without departing from the spirit and broader aspects thereof as set forth in the appended claims.

What is claimed is:

1. A haze-reducing coating on a conductive doped tin oxide film on a substrate formed by:

providing a glass substrate having a conductive doped tin oxide film disposed on a surface thereof, said conductive doped tin oxide substrate having said film thereon exhibiting haze;

providing a coating solution of a metallic oxide precursor in a suitable carrier solvent, said metallic oxide precursor being selected to form one of: 1) an oxide of an element selected from the group consisting of tungsten, molybdenum, manganese, chromium, rhenium, iridium, zinc, nickel, indium, tin, titanium, zirconium, vanadium, and silicon and 2) a mixed oxide including an oxide of an element selected from the group consisting of tungsten, molybdenum, manganese, chromium, rhenium, iridium, zinc, nickel, indium, tin, titanium, zirconium, vanadium, and silicon;

coating said conductive doped tin oxide film on said substrate surface with said coating solution by a wet chemical solution deposition process to form a coating of a desired thickness; and removing said solvent and converting said precursor to a solid-state metal oxide film overlying said conductive doped tin oxide film to reduce the haze present in said conductive film on said substrate surface.

2. A coated substrate in accordance with claim 1 wherein said conductive doped tin oxide film on said substrate surface has a sheet resistance of less than or equal to 20 ohms/square.

3. A coated substrate in accordance with claim 2 wherein said metallic oxide precursor is selected to form a metallic oxide selected from the group consisting of tungsten oxide, molybdenum oxide, manganese oxide, chromium oxide, rhenium oxide, tin oxide, iridium oxide, nickel oxide, titania, and silicon dioxide.

4. A coated substrate in accordance with claim 3 wherein said carrier solvent is a lower carbon alcohol selected from the group consisting of methanol, ethanol, propanol, isopropanol, sec-butanol and mixtures thereof.

5. A coated substrate in accordance with claim 2 wherein said metallic oxide precursor is a metal-peroxy acid ester.

6. A coated substrate in accordance with claim 5 wherein said coating solution is applied to said substrate by a wet chemical solution deposition process selected from the group consisting of dip coating, spin coating, spray deposition and casting.

7. A coated substrate in accordance with claim 6 wherein said converting step comprises heating said coated substrate to a conversion temperature of from about 250° C. to about 350° C.

8. A coated substrate in accordance with claim 7 wherein said converting step comprises holding said coated substrate at said conversion temperature for about 15 to 120 minutes.

9. A coated substrate in accordance with claim 1 wherein said conductive doped tin oxide film on said substrate surface has an initial haze level of less than about 30%.

10. A coated substrate in accordance with claim 9 wherein said conductive doped tin oxide film on said substrate surface has an initial haze level of less than about 10%.

11. A coated substrate in accordance with claim 1 in which said metallic oxide precursor is selected to form an electrochromically-active metallic oxide whereby said solid-state metallic oxide film overlying said tin oxide surface is an electrochromically-active metallic oxide film.

12. A coated substrate in accordance with claim 11 wherein said metallic oxide precursor is a metal-peroxy acid ester.

13. A coated substrate in accordance with claim 11 wherein said coating solution is applied to said substrate by a wet chemical solution deposition process selected from the group consisting of dip coating, spin coating, spray deposition and casting.

14. A coated substrate in accordance with claim 13 wherein said converting step comprises heating said coated substrate to a conversion temperature of from about 250° C. to about 350° C.

15. A coated substrate in accordance with claim 14 wherein said converting step comprises holding said coated substrate at said conversion temperature for about 15 to about 120 minutes.

16. A coated substrate in accordance with claim 15 wherein said conductive doped tin oxide film on said substrate surface has an initial haze level of less than about 30%.

17. A coated substrate in accordance with claim 16 wherein said conductive doped tin oxide film on said substrate surface has an initial haze level of less than about 10%.

18. A coated substrate in accordance with claim 11 wherein said conductive doped tin oxide film on said substrate surface has a sheet resistance of less than or equal to 20 ohms/square.

19. A coated substrate in accordance with claim 18 wherein said metallic oxide precursor is a metal-peroxy acid ester.

20. A coated substrate in accordance with claim 1 wherein said metallic oxide precursor is a metal-peroxy acid ester.

21. The coated substrate of claim 1 which includes selecting a metallic oxide precursor which will yield an electrically conductive metallic oxide such that said solid-state metal oxide film overlaying said conductive doped tin oxide film on said substrate surface will be conductive.

22. The coated substrate of claim 21 in which said metallic oxide precursor is selected so as to yield upon conversions, a tin oxide layer, a doped tin oxide layer, an indium oxide layer or an indium tin oxide layer.

23. A coated substrate in accordance with claim 21 wherein said conductive doped tin oxide film on said substrate surface has a sheet resistance of less than or equal to 20 ohms/square.

24. A coated substrate in accordance with claim 23 wherein said conductive doped tin oxide film on said substrate surface has an initial haze level of less than about 30%.

25. A coated substrate in accordance with claim 24 wherein said conductive doped tin oxide film on said substrate surface has an initial haze level of less than about 10%.

26. A haze-reducing coating on a substrate having a conductive doped tin oxide film on a surface thereof formed by:
   providing a glass substrate having a conductive doped tin oxide film disposed on a surface of said substrate,
   providing a solid-state precursor in liquid form, said solid-state precursor in liquid form being selected to form one of: 1) a solid-state oxide of an element selected from the group consisting of tungsten, molybdenum, manganese, chromium, rhenium, iridium, zinc, nickel, indium, tin, titanium, zirconium, vanadium, and silicon, and 2) a mixed solid-state oxide including a solid-state oxide of an element selected from the group consisting of tungsten, molybdenum, manganese, chromium, rhenium, iridium, zinc, nickel, indium, tin, titanium, zirconium, vanadium, and silicon;
   coating said conductive doped tin oxide film on said substrate surface with said precursor liquid by a wet chemical coating deposition process; and
   converting said precursor liquid to a solid-state film overlying said conductive doped tin oxide film to reduce the haze present in said conductive doped tin oxide film on said substrate surface.

27. A coated substrate in accordance with claim 26 wherein said precursor liquid is applied to said substrate by a wet chemical coating deposition process selected from the group consisting of dip coating, spin coating, spray deposition and casting.

28. A haze-reducing coating on a substrate having a conductive doped tin oxide film on a surface thereof formed by:
   providing a glass substrate having a conductive doped tin oxide film disposed on a surface of said substrate;
   providing a solid-state precursor in liquid form;
   coating said conductive doped tin oxide film on said substrate surface with said precursor liquid by a wet chemical coating deposition process selected from the group consisting of dip coating, spin coating, spray deposition and casting; and
   converting said precursor liquid to a solid-state film overlying said conductive doped tin oxide film to reduce the haze present in said conductive doped tin oxide film on said substrate surface; said precursor liquid comprising a carbon polymer precursor.

29. A coated substrate in accordance with claim 28 wherein said conductive doped tin oxide film on said substrate surface has an initial haze level of less than about 30%.

30. A coated substrate in accordance with claim 29 wherein said conductive tin oxide film on said substrate surface has an initial haze level of less than about 10%.

31. A coated substrate in accordance with claim 29 wherein said precursor liquid is an acrylated epoxy urethane polymer.

* * * * *